H. O. FREEMAN.
Milk Stirrer.
No. 201,771. Patented March 26, 1878.
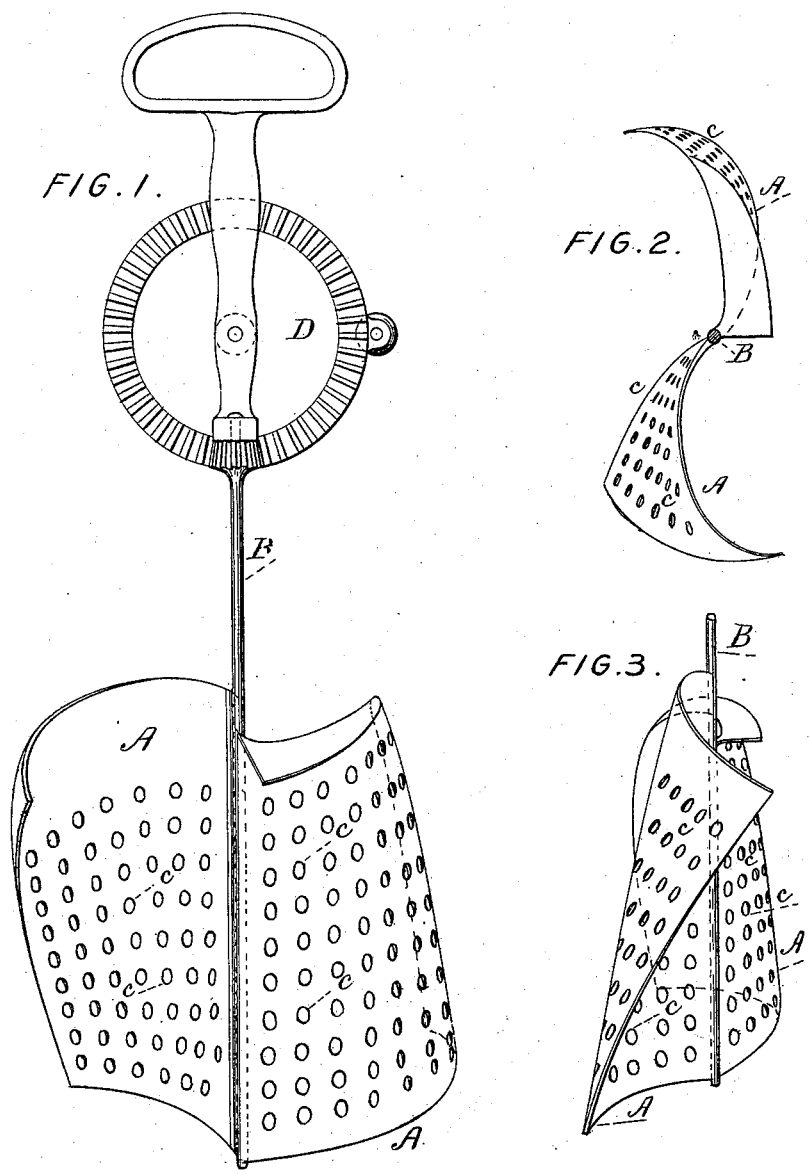
WITNESSES.
James E. Wheeler
F. W. Ricks
Henry O. Freeman
INVENTOR.

UNITED STATES PATENT OFFICE.

HENRY O. FREEMAN, OF SHERBURNE, NEW YORK, ASSIGNOR TO AMERICAN DAIRY AND COMMERCIAL COMPANY, OF NEW YORK CITY.

IMPROVEMENT IN MILK-STIRRERS.

Specification forming part of Letters Patent No. 201,771, dated March 26, 1878; application filed March 4, 1878.

*To all whom it may concern:*

Be it known that I, HENRY O. FREEMAN, of the town of Sherburne, in the county of Chenango, in the State of New York, have invented a new and useful improvement in the apparatus for mixing liquid fat, oil, or melted butter with milk for the purpose of making cheese, whereby a more thorough mingling of the fat, oil, or butter with the milk is produced, the fat, oil, or butter is more minutely divided, and a more perfect and uniform emulsion is produced.

My invention consists in a stirrer or mixer which can be operated either by hand or by steam or other motive power, and which is constructed as shown in the accompanying drawing.

Figure 1 represents a full view of the apparatus with a gearing, D, attached, by which it can be operated by hand. It can also be operated by any motive power, and raised and lowered at pleasure by means of well-known gearing, which it is unnecessary to describe here.

Extending down and depending from the gearing D is the shaft B, to which are attached the two blades or paddles A A. The blades A A are joined firmly to the shaft B, so as to be carried around with it when the shaft is revolved by the gearing. The blades A A extend outwardly from the shaft B, so as nearly to touch the side of the vat or vessel in which the apparatus may be used. They are made of thin sheets of wood or metal, and are perforated with small holes $c$ $c$ $c$ over their entire surface. The blades A A are curved from the shaft B to their outer edge, in such a manner, referring to the direction of the motion of the blades, as to make the front surface of them concave, and to make them at their outer edge slant backward from the top to the bottom. The blades are fastened to the shaft B in a straight line; but they may also be attached to the shaft in a spiral line, so that the lower end of the blades shall be fastened to the shaft B about one-fourth of the circle behind the point where the upper end is fastened to the shaft B, referring to the direction of the movement of the shaft and blades.

Fig. 2 is a view of the blades from a point above the blades. Fig. 3 is a perspective view of the blades.

The object sought to be accomplished, and which is effected by this machine, is the thorough mixing of the melted fat, butter, or oil with the milk in an open vat, so that the oil or fat or butter shall be broken up into minute globules, and thoroughly and uniformily mixed with the milk. The method in which this is effected is as follows: One or more of these stirrers, depending on the size of the vat, are suspended over the vat, with suitable gearing to revolve and to raise and lower them. The vat is partly filled with milk, and the melted fat, butter, or oil is then poured into the vat, and, being lighter than the milk, floats on the top of it. The stirrers are then lowered into the vat and caused to revolve rapidly. The form of the blades is such as to prevent any splashing of the contents of the vat or throwing of the contents against the sides of the vat or over its top, but on the contrary throws the contents downward, and forces them through the holes in the blades, thereby causing the oleaginous matter to be minutely divided and thoroughly and uniformly mixed with the milk. When the contents of the vat are thoroughly mixed the rennet is thrown into the vat, and as soon as the coagulation commences the stirrers are withdrawn.

In manufacturing cheese under my invention described in and secured by Letter Patent No. 136,051, dated February 18, 1873, I have experienced great difficulty in mixing the oil, fat, or butter with the milk with the machines now and heretofore in use for that purpose, by reason of the throwing of the contents of the vat against the sides of the vat and upward and over the top of the vat, said machines operating like the churns now in use, which are used with closed vessels, and are intended to throw the milk upward and outward, whereas the cheese being made in an open vessel it is desirable to give a downward and inward motion to the contents of the vat, which effect is accomplished by the machine I have described; and a more minute division of the oleaginous matter, and a more thorough and uniform mixture of it with the milk, is also effected by this machine.

I claim as my improvement in stirrers—

The series of perforated blades formed and arranged in relation to each other and to the axis of the stirrer, substantially in the manner hereinbefore described, so as to cause the contents of the vat to move inward, downward, and in part through the holes, and thereby produce a more perfect emulsion of the oleaginous matters and the milk.

HENRY O. FREEMAN.

Witnesses:
JAMES E. WHEELER,
F. W. RIECKS.